United States Patent
Pueschel et al.

(10) Patent No.: US 6,361,126 B1
(45) Date of Patent: Mar. 26, 2002

(54) BRAKE PRESSURE CONTROL DEVICE AND A METHOD FOR ACTIVATING AND DEACTIVATING A HYDRAULIC BRAKE BOOSTER

(75) Inventors: Helmut Pueschel, Marbach; Hanniel Schmidt, Karlsbad; Helmut Wiss, Moeglingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/587,477

(22) Filed: Jun. 5, 2000

(30) Foreign Application Priority Data

Jun. 5, 1999 (DE) .......................................... 199 25 794

(51) Int. Cl.⁷ ................................................. B60T 8/34
(52) U.S. Cl. ................................ 303/114.3; 303/113.3; 303/113.4
(58) Field of Search .............................. 303/3, 15, 152, 303/166, 113.1, 113.2, 113.3, 113.4, 114.3, 116.1, 116.2, 119.1

(56) References Cited

U.S. PATENT DOCUMENTS 5,568,962 A * 10/1996 Enomoto et al. .............. 303/3
5,727,852 A * 3/1998 Pueschel et al. ......... 303/113.4

FOREIGN PATENT DOCUMENTS

| DE | 195 01 760 | 7/1996 |
|---|---|---|
| DE | 197 56 080 | 7/1999 |
| GB | 2 281 364 | 3/1995 |

* cited by examiner

Primary Examiner—Christopher P. Schwartz
(74) Attorney, Agent, or Firm—Kenyon & Kenyon (57) ABSTRACT

A brake pressure control device is described. The device includes a pneumatic brake booster which has at least two chambers that are separable from each other. At least one of the chambers can be operated as a low-pressure chamber and at least another one of the chambers can be oerated as a working chamber. The device further includes a master braking cylinder in which a master cylinder pressure is generated over the pneumatic brake booster, and a hydraulic unit, which is installed between the master cylinder and at least one wheel brake cylinder of at least one wheel. The hydraulic unit includes an arrangement of switchable valves as well as least one pump. A hydraulic boost of the brake pressure is achievable with the assistance of the hydraulic unit. A wheel brake cylinder pressure may be generated in the at least one wheel brake cylinder with the assistance of the hydraulic unit, the wheel brake cylinder pressure being greater than the master cylinder pressure. A drive input point can be determined at which the hydraulic unit is activated taking into account the time-related derivation of the master cylinder pressure, the differential pressure between the pressure in the working chamber and the ambient pressure when the brake pedal is unactivated, as well as of the time-related derivation of the differential pressure between the pressure in the working chamber and the ambient pressure.

15 Claims, 4 Drawing Sheets

BRAKE PRESSURE CONTROL DEVICE AND A METHOD FOR ACTIVATING AND DEACTIVATING A HYDRAULIC BRAKE BOOSTER

FIELD OF THE INVENTION

The present invention relates to a brake pressure control device and a method for activating and deactivating a hydraulic brake booster.

BACKGROUND INFORMATION

From British Patent No. 2,281,364, describes a brake pressure control device for a hydraulic dual-circuit braking system having a pneumatic brake booster. For each braking circuit, an arrangement of valves is provided as well as a return pump. Furthermore, an electronic control unit is present, which, from processing sensor signals containing information on the manner of the activation of the brake pedal, generates signals for driving switch-over valves, pre-charge control valves, intake and exhaust valves, and the return pumps. A pneumatic brake booster described in this British patent includes two chambers, separated from each other by a valve, of which one is operated as a low-pressure chamber and the other as a working or drive chamber. A modulation valve is provided, using which the working chamber of the brake booster is ventilated. The purpose of the brake pressure control device is to assure the highest possible values for the vehicle deceleration in response to an automatically controlled hard stop. An automatically controlled hard stop of this type is known as a "braking assistant." The braking pressures necessary for the automatic hard stop are generated with the assistance of the valve arrangement and the return pumps, i.e., through the appropriate driving of the hydraulic unit.

British Patent No. 2,281,364 also describe, a target braking, i.e., a braking process in normal traffic circumstances monitored by the driver, occurs without the support of the hydraulic unit. However, in this case, which nevertheless arises predominantly in normal traffic circumstances, the power boost is accomplished by the pneumatic brake booster alone. The latter must therefore be designed to attain the maximum required braking pressures. In a pneumatic brake booster of this type, the greatest disadvantage is its size, which is determined by the braking pressures to be attained. It is also disadvantageous in this arrangement that the solenoid valves of the valve arrangement, in particular the switch-over and the pre-charge control valves, have to be designed for the comparatively high master cylinder pressures that are produced using a pneumatic brake booster of this type. In contemporary brake boosters, these pressures are in the order of magnitude of up to 250 bar.

German Patent No. 195 01 760 describes, a method and a device for controlling an ABS-ASR system, using which it is possible to replace the vacuum brake booster entirely or partially with a hydraulic brake booster. The hydraulic power boost is accomplished by a controlled driving of the valve arrangement and the return pumps. However, a complete replacement of the pneumatic brake booster has the consequence that the return pumps of the braking system must be set in operation in every braking process in which an increase or boosted braking pressure is to be generated in the wheel cylinders. This has the disadvantage that the return operation can lead to pedal pulsations, which, in particular at lower pedal forces, can be perceived as disturbing. As a further point, a braking system based exclusively on a hydraulic power boost offers less redundancy in the event of a failure or defect in the hydraulic unit.

Unpublished German Patent Application No. 197 56 080 describes, a brake pressure control unit which is improved with regard to contradictory requirements, the greatest possible comfort combined with the greatest possible reliability and smallest possible space. For this purpose, the device described there has a pneumatic brake booster, which is designed such that it reaches its modulation point, i.e., the point at which the brake pressure support can no longer be increased using the pneumatic brake booster, at a master cylinder pressure of more than zero and less than 50 bar. In this context, an essential difference in the functioning of the "braking assistant" lies in the fact that a substantially proportional dependency exists between the control pressures and the braking pressures in the wheel braking cylinders over a broad operational range of the braking system, i.e., as far as possible all of the pedal positions of the brake pedal and therefore for virtually all of the control pressures input by a driver of the vehicle.

It is also known from this application to provide means for displaying the arrival at the modulation point of the pneumatic brake booster. These means can be designed so that they determine a differential pressure between the working chamber of a pneumatic brake booster and an external ambient pressure, and they, in the event that a threshold value is not reached, generate an identifier representing the modulation point. A method of this type yields very good results in quasi static braking processes. However, it has proven to be the case that in response to a rapid application of the brakes, an activation of the hydraulic boost can under certain circumstances occur relatively late, so that a significant resistance threshold is noticeable during braking.

SUMMARY

An objective of the present invention is, inter alia, to make possible a braking process which takes optimal account of the requirements of pedal comfort, capacity for quantitative regulation of the braking force, and reliability even in response to different brake application dynamics (pedal actuation speed).

This object is achieved by providing a brake pressure control unit and a method for activating and/or deactivating a hydraulic brake booster in according with the present invention. In addition, further advantages are yielded.

The brake pressure control unit according to the present invention and the method according to the present invention make possible an optimal driving of a hydraulic brake booster, so that in particular in response to a rapid application of the brakes, an activation of the hydraulic brake booster takes place promptly, so that losses of comfort or of reliability can be effectively avoided. By taking into account the time-related derivation of the master cylinder pressure and the differential pressure between the pressure in the working chamber or the vacuum chamber of the brake booster and the ambient pressure, an optimal application of a hydraulic brake booster using a hydraulic unit can be achieved, without making concessions in driving comfort. The control unit according to the present invention, in an optimal manner, satisfies the requirements of pedal comfort, capacity for quantitative regulation of the braking force, and reliability, and also makes it possible that, in contrast to an evaluation of the differential pressure between the working chamber of a brake booster and an external ambient pressure, the differential pressure between the low-pressure chamber of a brake booster and an external ambient pressure is evaluated. In the event that the differential pressure between the low-pressure chamber of the brake booster and an external ambient pressure is measured, but the pressure in the working chamber of the brake booster is not measured by a measuring signal during the brake actuation, the pressure in the working chamber of the brake booster can be calculated, for example, taking into account the differential pressure between the low-pressure chamber and the ambient pressure, the master cylinder pressure, the time-related derivations of the master cylinder pressure, the duration of braking, and the time intervals of the braking duration.

According to the present invention, it may be advantageous to determine the drive trigger point, at which the hydraulic unit is activated and/or deactivated, by taking into account the differential pressure between the pressure in the working chamber or the pressure in the low-pressure chamber and the ambient pressure when the brake pedal is unactivated. In particular, it is relatively easy to take into account a differential pressure of this type when the brake pedal is unactivated and leads to good results.

It may also be advantageuos to determine the drive trigger point at which the hydraulic unit is activated and/or deactivated by taking into account the time-related derivation of the master cylinder pressure, the differential pressure between the pressure in the working chamber and the ambient pressure when the brake pedal is unactivated, as well as the time-related derivation of the differential pressure between the pressure in the working chamber and the ambient pressure. By taking into account the parameters cited, it is possible in a simple manner to achieve good measuring results. According to a further advantageous embodiment, it is also possible that the drive trigger point at which the hydraulic unit is activated and/or deactivated is also determined by taking account of the time-related derivation of the master braking cylinder pressure and of the differential pressure between the pressure in the working chamber and the ambient pressure when the brake pedal is unactivated, while taking account of a calculated time-related derivation of the differential pressure between the pressure in the working chamber and the ambient pressure, from knowledge of the vacuum booster characteristic, the time-related derivation, the braking duration, and the differential pressure.

According to an advantageous embodiment of the brake pressure control unit according to the present invention and of the method according to the present invention, the drive trigger point for activating the hydraulic unit is determined using the differential pressure between the pressure in the working chamber and the ambient or atmospheric pressure as a master cylinder pressure threshold value according to a formula (1) of the form $$p_{HZ\_threshold}=p_{HZ1}-k1*(d\,pHZ/dt)+k2*\Delta pB_0-k3*f(\Delta pB, d\Delta pB/dt);$$

and using the differential pressure between the pressure in the vacuum chamber and the ambient pressure as a master cylinder pressure threshold value according to a formula (2) of the form $$p_{HZ\_threshold}=p_{HZ1}-k1*(d\,pHZ/dt)+k2*\Delta pB_0-k3*f(pHZ, d\,pHZ/dt, t_{brake}, \Delta t_{brake});$$

$p_{HZ1}$, k1, k2, and k3 being system constants to be determined and $f(\Delta pB, d\Delta pB/dt)$, $f(pHZ, d\,pHZ/dt, t_{brake}, \Delta t_{brake})$ being system functions. The constants or parameters to be determined as well as the system functions are advantageously ascertained in the context of driving tests and/or simulations.

It is clear on the basis of the formulas provided that the hydraulic boost is a function of the brake application dynamic and of the potential capacity of the pneumatic brake booster (booster capacity). In response to a rapid application of the brakes, the activation of the hydraulic booster takes place earlier than in response to a quasi static brake pedal actuation. The dynamic terms of the equation therefore have a negative sign. By using the method according to the present invention, it is possible to do without stipulating a concrete modulation point of a pneumatic brake booster as well as sensing the pressure regulating valve stroke.

In response to a quasi static brake pedal actuation, the drive trigger point of the brake booster can be reached in the limiting case. This is related to the fact that the differential pressure between the working chamber pressure and the ambient pressure is a function of the rod path and of the actuation speed of the brake pedal.

It is further advantageous that the drive trigger point of the master cylinder pressure threshold value is determined for the de-activation according to a formula (3) of the form $$p_{HZ\_threshold}=p_{HZ2}-k4*(d\,pHZ/dt)+k5*\Delta pB_0$$

$p_{HZ2}$, k4, k5 again representing system constants. The determination of constants k4, k5 is advantageously made again using driving tests or simulations.

The master cylinder pressure threshold value for the activation of the hydraulic unit advantageously corresponds to that for the deactivation of the hydraulic unit.

DETAILED DESCRIPTION

Figure 1:
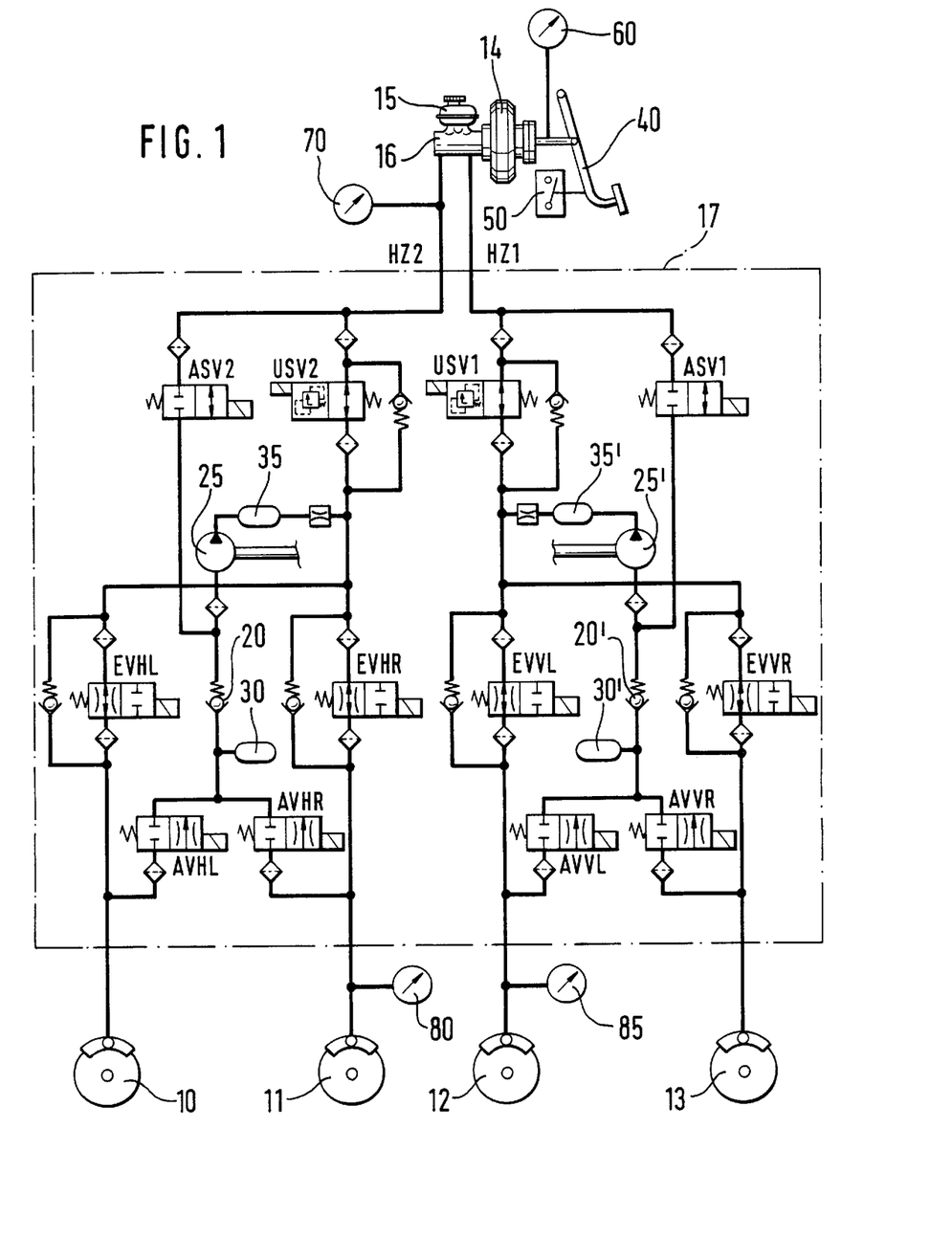
FIG. 1 depicts a schematic circuit diagram of a possible brake system, which provides an example of the baseline for the present invention.

FIG. 1 shows a schematic representation of a brake pressure control unit that is described in German Patent No. 195 01 760 and German Patent Application No. 197 56 080. Reference numerals 10, 11, 12, 13 designate wheel brake cylinders, in each case, of a wheel of a motor vehicle. Wheel brake cylinders 10 and 11 belong to a first brake circuit and wheel brake cylinders 12 and 13 to a second brake circuit. Reference numeral 40 designates the brake pedal, via which pressure can be generated in a conventional manner in a master brake cylinder 16 in connection with a pneumatic brake booster 14. Master brake cylinder 16 is connected in a conventional manner to a brake fluid container 15. Between master brake cylinder 16 and wheel brake cylinders 10 through 13, a hydraulic unit 17 is installed, which includes an arrangement of valves and, in this case, two return pumps 25, 25'. The arrangement of valves, includes for each brake circuit a switch-over valve USV1, USV2, a pre-charge or aspirator valve ASV1, ASV2, as well as, for each wheel brake cylinder, an intake valve EV and an exhaust valve AV. Reference numerals HL, HR, VL, and VR, in connection with intake and exhaust valves EV and AV, indicate the position, shown here by way of example, of each wheel brake cylinder in the motor vehicle. Thus HL indicates rear left, VL front left, HR rear right, and VR front right. Furthermore, hydraulic unit 17 includes storage devices 30, 30', 35, 35', which function in a known manner to receive brake fluid. Furthermore, a plurality of return valves such as valves 20, 20' is also provided. The mode of functioning of hydraulic unit 17 described in this manner is described in German Patent application No. 195 01 760 a result of the appropriate driving of switch-over valves USV1, USV2, of aspirator or pre-charge valves ASV1, ASV2, as well as of return pumps 25, 25', and of the intake and exhaust valves, both a pressure buildup and a pressure reduction, as well as a condition of pressure maintenance, can be generated in wheel brake cylinders 10 through 13. In this context, with the assistance of pumps 25, 25', a higher pressure can be generated in wheel brake cylinders 10 through 13 than exists in master brake cylinder 16. Reference numeral 60 designates a sensor which generates information concerning the pedal position of the brake pedal. Reference numeral 70 designates a sensor by which information can be generated regarding brake pressure $p_{HZ}$ in master cylinder 16. Reference numerals 80 and 85 designate sensors by which information can be generated concerning the braking pressures in wheel brake cylinders 11 and 12. And reference numeral 50 designates a brake light circuit.

Figure 2:
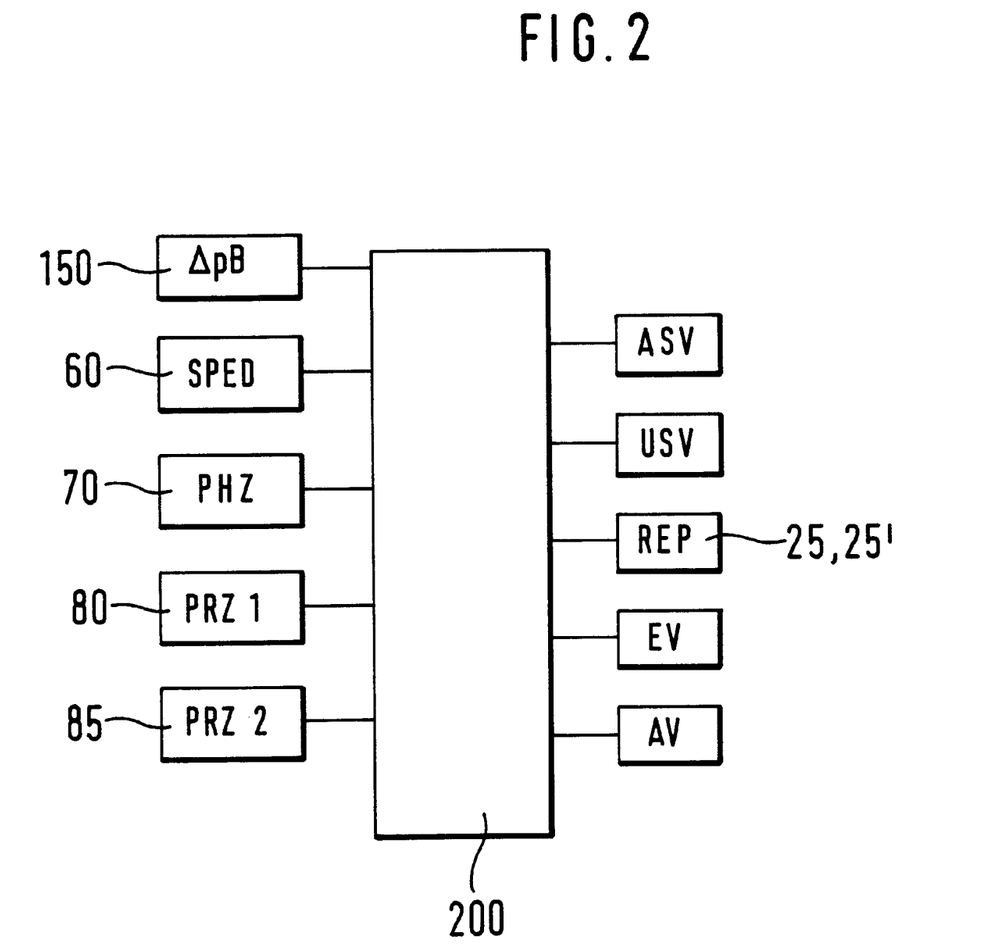
FIG. 2 depicts a basic representation of the control unit.

FIG. 2 depicts a schematic representation of a control unit 200 for driving the valves and return pumps 25, 25' of hydraulic unit 17. On the input side, the signals of sensors 60, 70, 80, and 85 are fed to control unit 200. In addition, control unit 200 receives value $\Delta pB$ via a means 150 of determining the pressure difference, as is discussed in detail below. In control unit 200, the input signals and the values generated from them, for example in the form of the above-mentioned and above-described formulas (1) and/or (2) and/or (3), are processed and linked in accordance with the type of application. Comparable linkages such as plus instead of minus, etc., and similar formula forms are also possible.

Figure 3A:
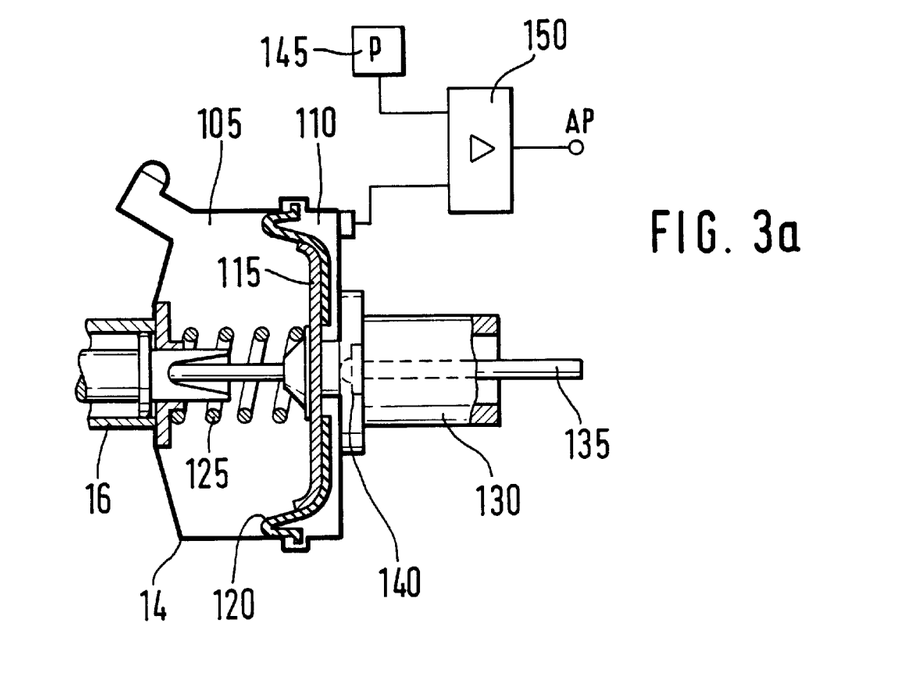
FIG. 3a depicts a pneumatic brake booster having a sensor for the differential pressure measurement between the working chamber of the brake booster and the ambient environment.
Figure 3B:
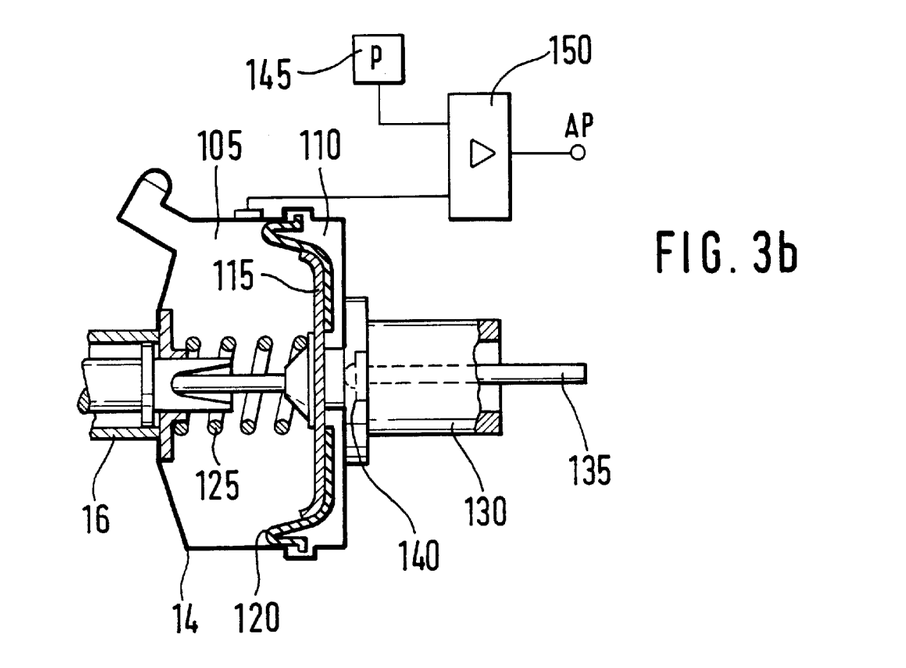
FIG. 3b depicts a pneumatic brake booster having a sensor for the differential pressure measurement between the vacuum chamber, or the low-pressure chamber, of the brake booster and the ambient environment.

FIG. 3 (depicted by FIGS. 3a and 3b) shows a pneumatic brake booster 14. It includes two chambers 105 and 110, separated from each other by an undepicted valve, of which in this example chamber 105 functions as the low-pressure chamber and chamber 110 as the working chamber. Both chambers 105 and 110 are separated by a movably supported working piston 115 in connection with a roller diaphragm 120. Reference numeral 125 designates a spring. Reference numeral 135 designates a piston rod, which, inside a control housing 130, is connected to a valve 140. On its side facing away from working piston 115, piston rod 135 is connected to brake pedal 40, undepicted here. Valve 140 functions to ventilate working chamber 110 of pneumatic brake booster 14.

According to the brake booster depicted in FIG. 3a, working chamber 110 is connected to a means 150 for determining a differential pressure between the ambient pressure and the pressure in working chamber 110. Reference numeral 145 designates a sensor for determining the ambient pressure. Means 150 determine the differential pressure between the ambient pressure and the pressure in working chamber 110.

According to the brake booster depicted in FIG. 3b, low-pressure chamber 105 is connected to a means 150 for determining a differential pressure between the ambient pressure and the pressure in the low-pressure chamber. Reference numeral 145 again designates a sensor for determining the ambient pressure. Means 150 determine the differential pressure between the ambient pressure and the pressure in low-pressure chamber 105.

Figure 4:
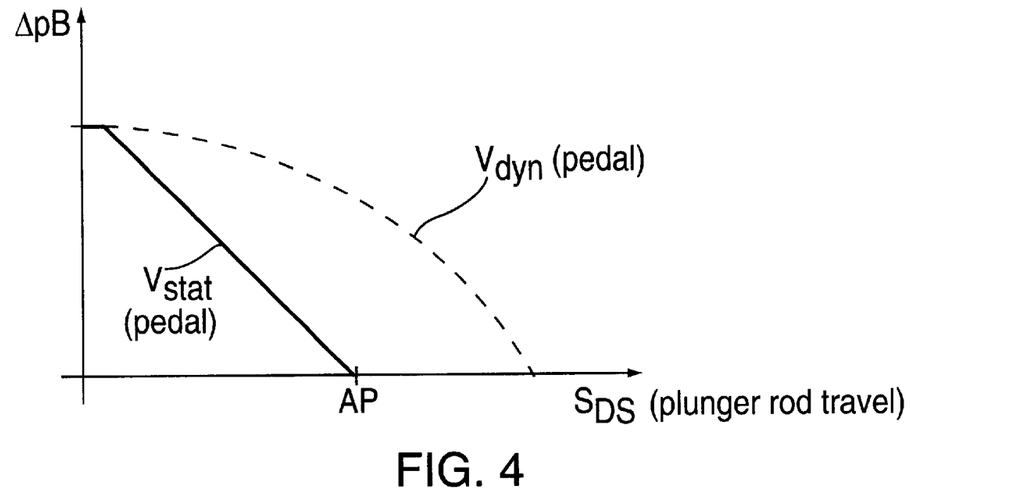
FIG. 4 depicts a characteristic curve representing the pressure differential between the ambient environment and the working chamber of the brake booster as a function of the pressure rod path in response to braking.

In a quasi static brake pedal actuation, the modulation point of brake booster 14 can be reached in the limiting case. This is related to the fact that differential pressure $\Delta pB =$ (patmosphere–pworking chamber) is a function of the rod path of piston rod 135 and of the actuation speed of brake pedal 40. The influence of the actuation speed of the brake pedal on the differential pressure curve is illustrated in FIG. 4 on the basis of two characteristic curves. Characteristic curve $v_{stat}$ depicts pressure characteristic $\Delta pB$ in response to a quasi static pedal actuation. In modulation point AP of brake booster, or vacuum booster, 14, pressure differential $\Delta pB$ goes to zero. The (dotted) characteristic curve $v_{dyn}$ illustrates pressure differential $\Delta pB$ in response to a rapid application of the brakes. It is evident that in modulation point AP a clear pressure differential $\Delta pB$ still exists. This means that in the modulation point the vacuum boost is too small (or is not optimally exploited) and the hydraulic boost in this case should be applied earlier. Using the formulas discussed in the introduction to the description and in the claims, a determination can be carried out of a master cylinder pressure threshold value $p_{HZ}$ at which the hydraulic activation of the brake booster is to be initiated, i.e., the determination of the drive trigger point, on the basis of the time-related derivation of master cylinder pressure (dpHZ/dt), the time-related derivation of the differential pressure (d$\Delta pB$/dt) established using means 150, and of differential pressure $\Delta pB_0$ when the brake pedal is unactivated. In addition, a deactivation takes place, as was already discussed, as a function of the time-related derivation of the master cylinder pressure and the differential pressure when the brake pedal is unactivated.

Figure 5:
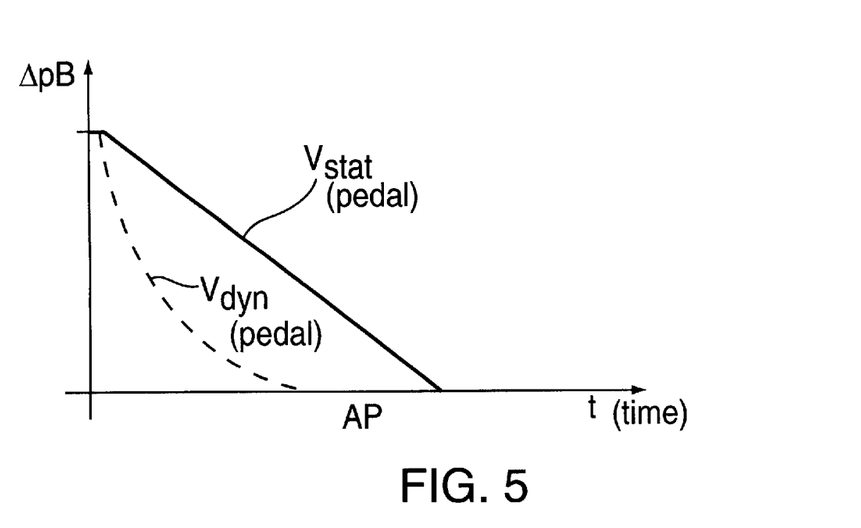
FIG. 5 depicts a characteristic curve for illustrating the pressure differential as a function of time in response to the process of applying the brakes.

In FIG. 5, in further discussion of the use of the present invention, pressure differential $\Delta pB$, in response to the process of applying the brakes, is depicted as a function of time. Here too, the different characteristic curves of the static and dynamic braking processes are clear.

On the basis of FIGS. 4 and 5, it can be seen that in response to slow, very sensitive braking, the hydraulic boost sets in just below power boost modulation point AP. In response to a rapid application of the brakes, the activation of the hydraulic boost lies well below the modulation point.

Depending on the braking dynamics and on further marginal conditions, the hydraulic boost in practice takes place, for example, at pressures between 5 and 50 bar.

Pressure differential $\Delta pB_0$, when the brake pedal is unactivated, can be monitored, for example, using a differential pressure sensor (not depicted in detail). A differential pressure sensor of this type, which can monitor the boost potential of the pneumatic brake booster, can sense the current values, for example, every 20 milliseconds and provide them to control device 200. The unactivated brake pedal (state of not activated brake pedal) can be detected, for example, by the brake light circuit.

In the exemplary embodiment presented, the specific pressures for creating various pressure differentials are detected by sensors. In this context, however, it is also possible to replace the one or the other sensor, or all sensors, by conventional pressure estimating processes.

What is claimed is:

1. A brake pressure control device, comprising:
   a pneumatic brake booster including at least two chambers that are separable from each other, at least one of the chambers being operated as a low-pressure chamber, and at least another one of the chambers being operated as a working chamber;
   a master braking cylinder in which a master cylinder pressure is generated using the pneumatic brake booster; and
   a hydraulic unit installed between the master braking cylinder and at least one wheel brake cylinder of at least one wheel, the hydraulic unit including switchable valves and at least one pump, a hydraulic boost of a brake pressure being achievable with the assistance of the hydraulic unit, a wheel brake cylinder pressure being generated in the at least one wheel brake cylinder with the assistance of the hydraulic unit, the wheel brake pressure being greater than the master cylinder pressure, a drive trigger point at which the hydraulic unit is at least one of activated and deactivated for boosting the brake pressure being determined as a function of a time derivation of the master cylinder pressure and of a differential pressure between at least one of a pressure in the low-pressure chamber and the working chamber, on the one hand, and an ambient pressure on the other hand.

2. The brake pressure control device according to claim 1, wherein the brake pressure control device is installed in a road vehicle.

3. The brake pressure control device according to claim 1, wherein the drive trigger point is determined as a function of the differential pressure between the at least one of the pressure in the low-pressure chamber and the working chamber, and the ambient pressure when a brake pedal is not activated.

4. The brake pressure control device according to claim 1, wherein the drive trigger point is determined as a function of the time-related derivation of the master cylinder pressure, a differential pressure between the pressure of the working chamber and the ambient pressure when a brake pedal is not activated, and a time-related derivation of the differential pressure between the pressure in the working chamber and the ambient pressure.

5. The brake pressure control device according to claim 1, wherein the drive trigger point is determined as a function of a time-related derivation of the master cylinder pressure and of the differential pressure between the pressure in the working chamber and the ambient pressure when a brake pedal is not activated, and as a function of a calculated time-related derivation of the pressure differential between the pressure in the working chamber and the ambient pressure, a vacuum booster characteristic curve, a braking duration, and the differential pressure.

6. The brake pressure control device according to claim 1, wherein the drive trigger point is determined for activating the hydraulic unit using the differential pressure between the pressure in the working chamber and the ambient pressure as a master cylinder pressure threshold value according to the following formula:

$$p_{HZ\_Threshold}=p_{HZ1}-k1*(d\,pHZ/dt)+k2*\Delta pB_0-k3*f(\Delta pB,\,d\Delta pB/dt)$$

and using the differential pressure between the pressure in the low-pressure chamber and the ambient pressure as a master cylinder pressure threshold value according to the formula:

$$p_{HZ\_threshold}=p_{HZ1}-k1*(d\,pHZ/dt)+k2*\Delta pB_0-k3*f(pHZ,\,d\,pHZ/dt, t_{brake},\,\Delta t_{brake});$$

wherein
   $p_{HZ1}$, k1, k2 and k3 are system constants, $f(\Delta pB, d\Delta pB/dt)$ and $f(pHZ, d\,pHZ/dt, t_{brake}, \Delta t_{brake})$ are system functions,
   $d\,pHZ/dt$ is a time-related derivation of the master cylinder pressure,
   $\Delta pB_0$ is the differential pressure between the pressure in the working chamber and the ambient pressure when a brake is not activated,
   $\Delta pB$ is the differential pressure between the pressure in the working chamber and the ambient pressure, and
   $d\Delta pB/dt$ is the time-related derivation of the differential pressure between the pressure in the working chamber and the ambient pressure.

7. The brake pressure control device according to claim 1, wherein the drive trigger point is determined for deactivating the hydraulic unit as a master cylinder pressure threshold value according to the formula:

$$p_{HZ\_threshold}=p_{HZ2}-k4*(d\,pHZ/dt)+k5*\Delta pB_0$$

wherein
   k4 and k5 are system constants,
   $d\,pHZ/dt$ is a time-related derivation of the master cylinder pressure, and
   $\Delta pB_0$ is the differential pressure between the pressure in the working chamber and the ambient pressure when a brake is not activated.

8. The brake pressure control device according to claim 1, wherein a master cylinder pressure threshold value for activating the hydraulic unit corresponds to that for deactivating the hydraulic unit.

9. A method for controlling a hydraulic brake booster of a brake pressure control unit, comprising:
   determining a drive trigger point at which a hydraulic unit is at least one of activated and deactivated for boosting a brake pressure, the drive trigger point being determined as a function of a time-related derivation of a master cylinder pressure and a differential pressure between a pressure in one of a low-pressure chamber and a working chamber of a pneumatic brake booster, on the one hand, and an ambient pressure on the other hand.

10. The method according to claim 9, wherein the determining step includes determining the drive trigger point as a function the differential pressure between the pressure in the one of the low-pressure chamber and the working changer of the pneumatic brake booster and the an ambient pressure when a brake pedal is not activated.

11. The method according to claim 9, wherein the determining step includes determining the drive trigger point as a function of a time-related derivation of a master cylinder pressure, a differential pressure between the pressure in the pressure chamber in the working chamber and the ambient pressure when a brake pedal is not activated, a time-related derivation of a differential pressure between the pressure in the working chamber and the ambient pressure.

12. The method according to claim 9, wherein the determining step includes determining the drive trigger point as a function of a time-related derivation of a master cylinder pressure and the differential pressure between the pressure in the working chamber and the ambient pressure when a brake pedal is not activated, as a function of a calculated time-related derivation of the differential pressure between the pressure in the working chamber and the ambient pressure, and as a function of a vacuum booster characteristic curve and a braking duration.

13. The method according to claim 9, wherein the determining step includes determining the drive trigger point for activating the hydraulic unit as a function of the differential pressure between the pressure in the working chamber and the ambient pressure as a master cylinder pressure threshold value according to the following formula:

$$p_{HZ\_Threshold} = p_{HZ1} k1*(d\,pHZ/dt) + k2*\Delta pB_0 - k3*f(\Delta pB, d\Delta pB/dt)$$

and using the differential pressure between the pressure in the low-pressure chamber and the ambient pressure as a master cylinder pressure threshold value according to the formula:

$$p_{HZ\_threshold} = p_{HZ1} - k1*(d\,pHZ/dt) + k2*\Delta pB_0 - k3*f(pHZ, d\,pHZ/dt, t_{brake}, \Delta t_{brake});$$

wherein $p_{HZ1}$, k1, k2 and k3 are system constants, $f(\Delta pB, d\Delta pB/dt)$ and $f(pHZ, d\,pHZ/dt, t_{brake}, \Delta t_{brake})$ are system functions, $d\,pHZ/dt$ is a time-related derivation of the master cylinder pressure, $\Delta pB_0$ is the differential pressure between the pressure in the working chamber and the ambient pressure when a brake is not activated, $\Delta pB$ is the differential pressure between the pressure in the working chamber and the ambient pressure, and $d\Delta pB/dt$ is the time-related derivation of the differential pressure between the pressure in the working chamber and the ambient pressure.

14. The method according to claim 9, wherein determining step includes determining the drive trigger point for deactivating the hydraulic unit as a master cylinder pressure threshold value according to the following formula:

$$p_{HZ\_threshold} = p_{HZ2} - k4*(d\,pHZ/dt) + k5*\Delta pB_0$$

wherein k4 and k5 are system constants, $d\,pHZ/dt$ is a time-related derivation of the master cylinder pressure, and $\Delta pB_0$ is the differential pressure between the pressure in the working chamber and the ambient pressure when a brake is not activated.

15. The method according to claim 9, wherein the master cylinder pressure threshold value for activating the hydraulic unit corresponds to that for deactivating the hydraulic unit.

* * * * *

UNITED STATES PATENT AND TRADEMARK OFFICE
CERTIFICATE OF CORRECTION

PATENT NO.  : 6,361,126 B1
DATED       : March 26, 2002
INVENTOR(S) : Helmut Pueschel et al.

It is certified that error appears in the above-identified patent and that said Letters Patent is hereby corrected as shown below:

Column 1,
Line 12, delete "From"
Line 52, change "describes," to -- describes --

Column 2,
Line 2, change "describes," to -- describes --
Line 6, delete "there"
Line 11, change "an essential" to -- a --
Line 35, change "objective" to -- object --
Line 43, change "in according" to -- in accordance --

Column 4,
Line 33, change "invention," to -- invention. --
Line 34, change "unit," to -- unit. --
Lines 38 and 42, change "environment," to -- environment. --
Line 47, change ",and" to -- . --

Column 5,
Line 1, change "valves," to -- valves --
Line 11, change "known" to -- conventional --

Signed and Sealed this

Eighteenth Day of February, 2003

JAMES E. ROGAN
*Director of the United States Patent and Trademark Office*